United States Patent
Sandee et al.

(10) Patent No.: US 9,527,061 B2
(45) Date of Patent: Dec. 27, 2016

(54) CATALYSTS

(75) Inventors: Albertus Jacobus Sandee, DeMeern (NL); Robert Johan Andreas Maria Terorde, Maarn (NL)

(73) Assignees: SASOL TECHNOLOGY (PROPRIETARY) LIMITED (ZA); BASF NEDERLAND B.V. (NL)

( * ) Notice: Subject to any disclaimer, the term of this patent is extended or adjusted under 35 U.S.C. 154(b) by 491 days.

(21) Appl. No.: 14/114,477

(22) PCT Filed: Apr. 28, 2011

(86) PCT No.: PCT/IB2011/051876
§ 371 (c)(1),
(2), (4) Date: Oct. 28, 2013

(87) PCT Pub. No.: WO2012/146950
PCT Pub. Date: Nov. 1, 2012

(65) Prior Publication Data
US 2014/0045952 A1  Feb. 13, 2014

(51) Int. Cl.
*B01J 23/00* (2006.01)
*B01J 23/89* (2006.01)
(Continued)

(52) U.S. Cl.
CPC ............ *B01J 23/8986* (2013.01); *B01J 23/06* (2013.01); *B01J 23/28* (2013.01); *B01J 23/34* (2013.01);
(Continued)

(58) Field of Classification Search
CPC ....... B01J 23/8986; B01J 23/28; B01J 23/462; B01J 23/06; B01J 35/0013; B01J 37/0201; B01J 37/0219; B01J 37/0207; B01J 23/34; B01J 23/745; B01J 23/8913; B01J 23/755; B01J 37/02; C10G 2/334; C10G 2/332; C10G 49/08; C10G 49/04
(Continued)

(56) References Cited

U.S. PATENT DOCUMENTS 5,744,419 A  4/1998  Choudhary et al.

FOREIGN PATENT DOCUMENTS

EP  0455307 A1  11/1991
EP  0510771     10/1992
(Continued)

OTHER PUBLICATIONS

Park, et al., "Influence of Bimodal Pore Size Distribution of RU/CO/Zr02-Al203 During Fischer-Tropsch Synthesis in Fixed-Bed and Slurry Reactor", "Elsevier, Amsteram, NL", Feb. 2, 2009, pp. 81-87, vol. 298, No. 1-2, Publisher: Journal of Molecular Catalysis A: Chemical.

(Continued)

*Primary Examiner* — Colleen Dunn
*Assistant Examiner* — Haytham Soliman
(74) *Attorney, Agent, or Firm* — Fellers, Snider, Blankenship, Bailey & Tippens, P.C.

(57) ABSTRACT

A process for preparing a catalyst precursor includes forming a slurry of particles of an insoluble metal compound, where the metal of the insoluble metal compound is an active catalyst component, with particles and/or one or more bodies of a pre-shaped catalyst support in a carrier liquid. The particles of the insoluble metal compound are thus contacted with the particles and/or the one or more bodies of the pre-shaped catalyst support. A treated catalyst support is thereby produced. Carrier liquid is removed from the slurry to obtain a dried treated catalyst support, which either directly constitutes the catalyst precursor, or is optionally calcined to obtain the catalyst precursor.

16 Claims, 2 Drawing Sheets

(51) Int. Cl.
| | | |
|---|---|---|
| *B01J 23/72* | (2006.01) | |
| *B01J 23/75* | (2006.01) | |
| *B01J 23/755* | (2006.01) | |
| *B01J 35/00* | (2006.01) | |
| *B01J 37/02* | (2006.01) | |
| *B01J 37/18* | (2006.01) | |
| *C10G 49/04* | (2006.01) | |
| *C10G 49/08* | (2006.01) | |
| *C10G 2/00* | (2006.01) | |
| *B01J 23/06* | (2006.01) | |
| *B01J 23/28* | (2006.01) | |
| *B01J 23/34* | (2006.01) | |
| *B01J 23/46* | (2006.01) | |
| *B01J 23/745* | (2006.01) | |

(52) U.S. Cl.
CPC .............. *B01J 23/462* (2013.01); *B01J 23/72* (2013.01); *B01J 23/745* (2013.01); *B01J 23/75* (2013.01); *B01J 23/755* (2013.01); *B01J 23/892* (2013.01); *B01J 23/8913* (2013.01); *B01J 35/006* (2013.01); *B01J 35/0013* (2013.01); *B01J 37/0201* (2013.01); *B01J 37/0205* (2013.01); *B01J 37/0207* (2013.01); *B01J 37/0219* (2013.01); *B01J 37/18* (2013.01); *C10G 2/332* (2013.01); *C10G 2/334* (2013.01); *C10G 49/04* (2013.01); *C10G 49/08* (2013.01)

(58) Field of Classification Search
USPC ......................................................... 502/325
See application file for complete search history.

(56) References Cited

FOREIGN PATENT DOCUMENTS

| | | |
|---|---|---|
| EP | 0510771 A1 | 10/1992 |
| EP | 0510772 A1 | 10/1992 |
| EP | 0736326 B1 | 8/2001 |
| WO | 99/34917 | 7/1999 |
| WO | 0128962 A1 | 4/2001 |
| WO | 2004/110622 A1 | 12/2004 |
| WO | 2006021754 A1 | 3/2006 |
| WO | PCT/IB2011/051876 | 2/2012 |

OTHER PUBLICATIONS

Yun-Jo Lee, et al., "Controlled Nanocrystal Deposition for Higher Degree of Reduction in Co/AlxO3 Catalyst", Jan. 22, 2009, vol. 130, No. 1-2, Publisher: Catalysis Letters (2009).

Puskas, et al., "Novel Aspects of the Physical Chemistry of Co/SiO2 Fischer-Tropsch Catalyst Preparations the Chemistry of Cobalt Silicate Formation During Catalyst Preparation or Hydrogenation", "Applied Catalysts A: General 311 (2006)", pp. 146-154, Publisher: Elsevier.

CATALYSTS

FIELD OF THE INVENTION

THIS INVENTION relates to catalysts. In particular, it relates to a process for preparing a catalyst precursor, and to a process for preparing a catalyst, which catalyst can be used, for example, in hydrogenation reactions, including hydrocarbon synthesis (for example Fischer-Tropsch (FT) synthesis) and including other hydrogenation reactions such as the hydrogenation of organic compounds.

BACKGROUND ART

Preparation of catalyst precursors by metal impregnation onto catalyst supports using various impregnation techniques is well known to those skilled in the art. The impregnated supports so obtained are then usually subjected to drying and calcination to provide catalyst precursors, and the precursors are then subjected to reduction to produce, finally, a catalyst.

EP-A-0 736 326 describes cobalt impregnated alumina based Fischer-Tropsch synthesis catalysts synthesized by means of aqueous slurry phase impregnation of a cobalt salt, for example cobalt nitrate hexahydrate, onto an alumina support, coupled with drying of the impregnated support, followed by direct fluidized bed calcination of the resultant impregnated support, to obtain a catalyst precursor, and then reducing the precursor to obtain the Fischer-Tropsch synthesis catalysts. These catalysts contain cobalt dispersed on the support. Higher cobalt loadings, which result in higher catalyst activities, can be achieved by repeating the cobalt salt impregnation step. However, this has a negative impact on the total process costs of catalyst fabrication and the time required to prepare the catalyst. Moreover, the maximum amount of metal that can be deposited per impregnation step is limited by the pore volume of the support.

Alternatively, suitable Fischer-Tropsch catalysts with high cobalt loadings can be prepared by mulling or kneading alumina (EP-A-0 455 307), silica (EP-A-0 510 771) or zirconia (EP-A-0 510 772) with a soluble or insoluble cobalt source. In that way, a paste can be obtained which is extruded, dried and calcined in order to obtain a catalyst or catalyst precursor. Especially in the case of an insoluble cobalt source, such as $Co(OH)_2$, a high loading of cobalt may be obtained in this way. In this approach, the final shape of the support is determined during the catalyst preparation process. As a result, the mechanical strength and physical shape of the support cannot be pre-defined. Also, in order to obtain mechanically strong catalysts according to these known methods, the extrudates have to be calcined at relatively high temperatures. The drawback of high calcination temperatures is that the catalyst performance is adversely affected. An additional drawback of mulling or kneading is that organic delaminating agents are often needed. Such compounds give rise to an exothermic combustion with an exhaust of polluting volatile organic compounds.

Yet a further alternative method of obtaining high cobalt loadings, is the precipitation of an insoluble cobalt compound using an excess alkaline precipitating agent, subsequently deposited on a support by adding a soluble aluminium compound such as sodium aluminate (WO-A-2006/021754). The precipitation of a cobalt compound at a pH of >8 on a solid support such as Kieselguhr (WO-A-01/28962) by adding a base, has also been reported. In such cases, $Co(NO_3)_2$ is often used as a starting compound that is suggested to precipitated on to the support as a cobalt hydroxide species (Appl. Catal. A: Gen. 311 (2006), 146). The disadvantage of precipitation processes that require chemical treatment, such as addition of a base, is the production of waste such as salts. This necessitates excessive filtration or washing steps in the preparation process. In addition, such processes do not necessarily ensure sufficient mechanical catalyst strength to avoid down stream problems regarding attrition issues.

Thus, there is a need for hydrogenation catalysts, including Fischer-Tropsch catalysts, with high loadings of active catalyst component such as cobalt, obtained by a simple preparation process that allows mechanically strong pre-shaped supports to be used and that avoids or at least reduces the use of chemical treatments, such as addition of a base, or other disadvantages as described above.

DISCLOSURE OF THE INVENTION

Thus, according to a first aspect of the invention, there is provided a process for preparing a catalyst precursor, which process includes forming a slurry of particles of an insoluble metal compound, where the metal of the insoluble metal compound is an active catalyst component, with particles and/or one or more bodies of a pre-shaped catalyst support in a carrier liquid, with the particles of the insoluble metal compound thus being contacted with the particles and/or the one or more bodies of the pre-shaped catalyst support, thereby to produce a treated catalyst support; and removing carrier liquid from the slurry to obtain a dried treated catalyst support, which either directly constitutes the catalyst precursor, or is optionally calcined to obtain the catalyst precursor.

It will thus be appreciated that, in some embodiments of the invention, the treated catalyst support will not need to be calcined, and thus forms or constitutes the catalyst precursor directly. However, in other embodiments of the invention, it will be necessary first to calcine the treated catalyst support in order to obtain the catalyst precursor.

By 'active catalyst component' is meant that the metal of the insoluble metal compound is such that it actively catalyses chemical reactions wherein an eventual catalyst obtained from the catalyst precursor, is used as a catalyst.

In this specification, the terms "insoluble metal compound" or "insoluble metal salt" mean a metal compound or a metal salt respectively, in respect of which there is no dissolution or only very low levels of dissolution in the carrier liquid used. Preferably, its solubility constant ($K_{sp}$ at 25° C.) in the carrier liquid is below $1 \cdot 10^{-8}$, preferably below $1 \cdot 10^{-12}$. For example, the $K_{sp}$ at 25° C. of cobalt hydroxide in water is $1.09 \cdot 10^{-15}$, that of nickel hydroxide in water is $5.47 \cdot 10^{-16}$, that of manganese hydroxide is $2.06 \cdot 10^{-13}$ and that of copper hydroxide in water is $2.2 \cdot 10^{-20}$.

The insoluble metal compound is preferably an insoluble metal salt, more preferably an insoluble inorganic metal salt.

In this specification, the term "inorganic metal salt" means a salt in which at least one metal atom is only associated with one or more inorganic groups, which association is by means of a bond, for example, by means of a covalent bond, a metal-to-ligand coordination or an ionic interaction.

In this specification, the term "slurry" is understood in terms of its general meaning as being a multiphase system of solid particles suspended in a carrier liquid. The mass proportion of carrier liquid to dry mass of solids, i.e.

insoluble metal compound particles plus catalyst support particles/bodies, may be at least 1:1, typically about 2:1.

The contacting of the particles of the insoluble metal compound with the particles and/or the one or more bodies of the pre-shaped catalyst support may be carried out for a period of time, preferably for at least 1 minute, more preferably for at least 10 minutes and even more preferably for at least 15 minutes, and most preferably for at least 20 minutes, but preferably for not more than 48 hours, more preferably for not more than 36 hours, even more preferably for not more than 20 hours, and most preferably for not more than 2 hours, before removal of the carrier liquid is commenced.

The process may include effecting the contacting of the particles of the insoluble metal compound with the particles and/or the one or more bodies of the pre-shaped catalyst support at an elevated temperature above 25° C., preferably above 50° C.; preferably, however, the elevated temperature is below 100° C.

The process may include contacting the pre-shaped catalyst support and/or the treated catalyst support and/or the dried treated catalyst support and/or the calcined treated catalyst support, at least once with a soluble metal compound. The metal of the soluble metal compound may also be an active catalyst component. The soluble metal compound may, in particular, be a soluble metal salt.

A "soluble metal compound" or "soluble metal salt" is a metal compound or salt respectively which is not an insoluble metal compound or salt. Preferably, the soluble metal compound/salt has a solubility, in the liquid it is in use to be dissolved in, of above 25 g/100 ml liquid, preferably above 100 g/100 ml liquid, at 25° C. For example, the solubility of cobalt nitrate in water is 133.8 g/100 ml, that of nickel nitrate in water is 238.5 g/100 ml, that of copper nitrate in water is 243.7 g/100 ml and that of manganese nitrate is 426.4 g/100 ml, all at 25° C.

The soluble metal salt, when used, may thus be contacted at least once with the particles of the insoluble inorganic metal salt and/or with the preshaped catalyst support particles. Thus, it may form part of the slurry, i.e. it may be dissolved in the carrier liquid. Instead, however, the treated catalyst support may be contacted at least once with the soluble metal salt, e.g. with a separate solution of the soluble metal salt. In cases where the treated catalyst support is calcined to form the catalyst precursor, the calcined treated catalyst support, i.e. the catalyst precursor, can even be contacted at least once with the soluble metal salt solution.

The formation of the slurry may include adding the insoluble metal salt particles and/or the preshaped catalyst support particles, to the carrier liquid to form a mixture which is mixed so as to suspend the particles in the carrier liquid. This mixing may be low shear mixing. It is to be appreciated that the consistency of the slurry is such (its viscosity is sufficiently low) that neither mulling or kneading thereof nor extrusion thereof, can be effected. Also, mixing, especially low shear mixing, does not constitute mulling or kneading.

The process may then, as a pretreatment step, include contacting the insoluble metal salt particles and/or the catalyst support particles, with the soluble metal salt, e.g. with a solution of the soluble metal salt.

More particularly, the slurry may be formed by first forming a suspension of the insoluble inorganic metal salt particles in the carrier liquid and then adding the preshaped catalyst support particles and/or bodies to the suspension, to form the slurry.

Preferably particles of the insoluble inorganic metal salt are added to the carrier liquid to form a suspension. The pre-shaped catalyst support may be added to the carrier liquid prior to and/or during and/or subsequent to the formation of the suspension, to form the slurry. It will thus be appreciated that the insoluble inorganic metal salt particles do not form in situ; the suspension is formed by admixing pre-existing insoluble inorganic metal salt particles with the carrier liquid.

The metals of the metal salts, i.e. the insoluble inorganic metal salt and the soluble metal salt, may be independently selected, and may be the same or different metals. Preferably, however, they are the same metal. Suitable metals for the purpose of the present invention may be selected from the group consisting of Groups Ib, IIb, Vb, VIb, VIIb and VIII of the Periodic Table of Elements. More preferably, they are selected from cobalt, nickel, ruthenium, manganese, iron, copper, zinc, molybdenum, a precious metal, and combinations of two or more thereof. Cobalt, nickel and copper are particularly suitable for preparing a hydrogenation catalyst precursor according to the process of the present invention. For cobalt based catalyst precursors, cobalt is preferably used in combination with itself The insoluble inorganic metal salt may, at least in principle, be any insoluble inorganic metal salt; however metal carbonate salts and, in particular, metal hydroxide salts, are preferred. The metal of the insoluble inorganic metal salt is preferably selected from the group consisting in cobalt, copper, nickel, manganese, or combinations of two or more thereof. When the metal in the insoluble inorganic metal salt is cobalt, cobalt hydroxide, cobalt carbonate, and, in particular, $Co(OH)_2$, are preferred.

The soluble metal salt is thus preferably such that its metal is also an active catalyst component. The soluble metal salt may be an inorganic metal salt and/or an organic metal salt. Combinations of different soluble metal salts, for example salts of different metals or salts with different organic or inorganic anions can be used.

In this specification, the term "organic metal salt" means a compound wherein at least one metal atom is associated with at least one organic group by means of a bond, for example, by means of a covalent bond, a metal-to-ligand coordination or an ionic interaction. Preferably, the metal atom is associated with at least one non-carbon atom of the at least one organic group, in particular with an oxygen atom of the organic group. The organic metal compound may also include one or more inorganic groups bound to the metal. Preferably, the one or more inorganic groups are cationic groups.

When a soluble inorganic metal salt is used, it may, at least in principle, be any soluble inorganic metal salt.

Suitable soluble metal salts include nitrates, sulfates, chlorides and ammonium citrates, preferably nitrates, acetates and ammonium citrates. The metal of the soluble metal salt is preferably selected from a group consisting in cobalt, copper, nickel, manganese, or combinations of two or more thereof. When a soluble inorganic metal salt is used, and its metal is cobalt, $Co(NO_3)_2 \cdot 6H_2O$, is preferred.

When a soluble organic cobalt salt is used, it may be that obtained by reacting a cobalt compound such as cobalt hydroxide or cobalt nitrate, with an organic acid, optionally in the presence of at least one counterion source. The cobalt compound is then preferably a cobalt basic compound. The counterion source, when present, is preferably an inorganic source, and preferably it is a source of one or more cations In one embodiment of the invention, the counterion source may be ammonia.

The organic cobalt salt can be formed in situ. Thus, the cobalt compound, e.g. cobalt hydroxide, can be dissolved in a solution of the organic acid in water.

The organic acid may be a carboxylic acid such as an acetic acid, citric acid ($C_6H_8O_7$), succinic acid ($C_4H_6O_4$), oxalic acid ($C_2H_2O_4$), acetic acid ($C_2H_4O_2$), gluconic acid ($C_6H_{12}O_7$) or EDTA, i.e. ethylenediaminetetraacetic acid. Preferably, the organic acid is citric acid.

In the organic cobalt salt solution, the molar ratio of cobalt to organic acid can vary widely, e.g. from 0.1:1 to 10:1. However, it is expected that the molar ratio of cobalt to organic acid will normally be in the range of 0.5:1 to 2:1, typically about 1:1.

In preferred embodiments of the invention, the organic cobalt salt may be cobalt ammonium citrate or cobalt ammonium EDTA.

Instead, the organic cobalt salt may be that obtained by reaction of a cobalt compound with acetylacetone ($C_5H_8O_2$).

In a preferred embodiment, sufficient insoluble inorganic metal salt and, optionally, soluble metal salt may be used so that the resultant amount of active metal component in proportion to the support in the catalyst precursor is between 5 and 90 mass %, preferably between 10 and 70 mass %, most preferably between 10 and 50 mass %, based on the total precursor mass.

The process may include subjecting the catalyst precursor, i.e. the treated catalyst support, to further treatment by forming a slurry of particles of the treated catalyst support, particles of an insoluble metal salt and a carrier liquid, removing carrier liquid from the slurry, and, optionally, calcining the further treated particles thus obtained, to obtain the catalyst precursor.

In specific embodiments of the invention as described hereunder, particles of the pre-shaped catalyst support are used. However, it is to be appreciated that, in other embodiments of the invention, the same principles can be applied to bodies of the pre-shaped catalyst support.

In a first embodiment of the invention, the formation of the slurry may comprise suspending the insoluble metal compound particles in the carrier liquid to form a suspension, and adding the particles of the pre-shaped catalyst support to the carrier liquid prior to and/or during and/or subsequent to the formation of the suspension, to form the slurry, with the active catalyst component, i.e. the metal of the insoluble metal compound, being deposited on the support particles. Preferably, no soluble metal compound is included in the slurry. Preferably, the deposition may be by means of chemisorption, preferably at a neutral to slightly acidic pH value, typically in the range of 8 to 2. The effect of chemisorption in this process is expressed by a change in pH value. This embodiment is thus characterized thereby that only chemisorption is effected.

Without wishing to be bound by theory, it is believed that, during chemisorption, deposition of a molecule of the active catalyst component on the support is achieved by the formation of a chemical bond between the support and the molecule. Also without wishing to be bound by theory, it is believed that this chemical bond is most likely the result of a condensation reaction.

In a second embodiment of the invention, the formation of the slurry may comprise suspending the insoluble metal compound particles in the carrier liquid to form a suspension, and adding the particles of the pre-shaped catalyst support to the carrier liquid prior to and/or during and/or subsequent to the formation of the suspension, to form the slurry, with the metal of the insoluble metal compound being deposited on the support particles, preferably by chemisorption; and the second embodiment of the invention further including, after the removal of carrier liquid from the slurry, contacting the dried treated catalyst support with the soluble metal compound by treating the dried treated catalyst support at least once with a solution of the soluble metal compound in a carrier liquid, with the metal of the soluble metal compound being deposited in and/or on the support particles, preferably by impregnation. Preferably no soluble metal compound is included in the slurry. There is, during the forming of the slurry and which thus constitutes a first process step, deposition of a first portion of an active catalyst component on the support particles. This deposition may be by means of chemisorption as hereinbefore described in respect of the first embodiment of the invention. However, in this embodiment of the invention, the treated catalyst support particles thus obtained are then, and with or without calcination thereof, subjected to further treatment by contacting them at least once, in a further process step, with a solution of the soluble metal salt in a carrier liquid with the metal of the soluble metal salt thus also being an active catalyst component and wherein the metal of the soluble metal salt impregnates the treated support particles, thereby forming a second portion of the active metal component. The impregnated and chemisorbed support is then calcined, and the catalyst precursor thereby obtained.

This second embodiment of the invention is thus characterized thereby that the chemisorption and impregnation is strictly carried out using the sequence of metal chemisorption first with the insoluble metal salt, and thereafter impregnation with the soluble metal salt.

In a third embodiment of the invention, the formation of the slurry may comprise forming a solution of the soluble metal compound in the carrier liquid, suspending the insoluble inorganic metal compound particles in the carrier liquid to form a suspension, and adding the particles of the pre-shaped catalyst support to the carrier liquid prior to and/or during and/or subsequent to the formation of the suspension, to form a slurry, with the metal of the insoluble metal compound being deposited on the support particles, preferably by chemisorption, while the metal of the soluble metal compound is deposited in and/or on the support particles, preferably by impregnation. The metal of the soluble metal salt is then also an active catalyst component. The active metal component is thus, in the same process step, deposited by chemisorption and is also impregnated onto and into the support to form the treated catalyst support, which is then calcined to obtain the catalyst precursor.

This third embodiment of the invention is thus characterized thereby that the chemisorption and impregnation are carried out simultaneously, i.e. in the same process step.

Preferably the impregnated support is subjected to at least partial carrier liquid removal prior to the calcination thereof.

Thus, the preferred manner of depositing the metal of the insoluble metal salt on the pre-shaped catalyst support is by chemisorption; the preferred manner of depositing the metal of the soluble metal compound on the pre-shaped catalyst support is by impregnation.

Surprisingly, it was found that with a process according to the invention and which preferably includes at least one chemisorption and one impregnation step, a high metal, e.g. cobalt, dispersion is usually obtained and at the same time, a high loading of metal, e.g. cobalt, may be achieved, usually with an increased catalyst activity compared to the standard manner of preparing such catalysts depositing only inorganic metal salts, e.g. inorganic cobalt salts by means of impregnation. Also, the process of the invention provides catalytic materials at low calcination temperatures excluding exotherms.

A promoter may also be introduced onto and/or into the catalyst support particles by pretreating the catalyst support particles before the slurry is formed or, preferably, by adding the promoter, or a precursor thereof, to the slurry. When present, the promoter is preferably one that is capable of enhancing the reducibility of the active catalyst component. The promoter may be introduced as a promoter precursor or compound which is a compound of a metal selected from the group consisting of palladium (Pd), platinum (Pt), ruthenium (Ru), rhenium (Re), Rhodium (Rh) and a mixture of one or more thereof. Preferably, the promoter compound is an inorganic or organic salt, and, preferably it is soluble in water. Preferably the promoter is an acetate, acetyl acetonate, nitrate or nitrosylnitrate. The mass proportion of the metal of the promoter the active component metal mass may be in the ratio of 1:5 to 1:10000. The mass proportion of the metal of the promoter (especially palladium or platinum) to the active component metal (especially cobalt) mass may be in the ratio of 1:300 to 1:3000. The mass proportion of the metal of the promoter (rhenium) to the active component metal (especially cobalt) mass may be in the ratio of 1:5 to 1:300.

The carrier liquid may thus be any suitable liquid solvent for the soluble metal salt, provided of course that the insoluble inorganic metal salt is insoluble in it. However, it is preferably water.

In this specification, the term "pre-shaped catalyst support" means that the shape of the catalyst support is determined by the catalyst support used and it remains essentially the same during the catalyst precursor preparation process, i.e. it is not transformed or altered during the catalyst precursor preparation process. In particular, there is thus no shaping of the catalyst support after it has been contacted with the insoluble metal salt.

The pre-shaped catalyst support may be porous. It may be selected from the group consisting in a monolith, structured packings, tablets, shaped artefacts, extrudates, spheres, or combinations of two or more thereof. In other words, when the pre-shaped catalyst support is in the form of one or more bodies, the bodies may be monoliths; however, when the pre-shaped catalyst support is in the form of particles, the particles may be structured packings, tablets, shaped artefacts, extrudates, spheres, or combinations of two or more of these. However, spherical pre-shaped catalyst support particles are preferred; they may have an average particle size of 50-150 micrometers.

Optionally, the support used in the slurry may have undergone, as a pretreatment, a chemical modification. By such a chemical modification is understood that the support could be pretreated by (i) being coated with another chemical inorganic material such as, without being restrictive, silica, alumina, zeolitic, or zirconia coating, or (ii) being impregnated with an organic material, which facilitates the metal dispersion, or (iii) being impregnated with a metal salt. Organic materials suitable for use in (ii) are widely known in the field and include such materials as organic acids, sugars or sugar alcohols, polyols or detergents, preferably the detergents are non ionic. Metal salts suitable for use in (iii) include some alkali, earth alkali, rare earth metal or transition metals, and can be impregnated to alter specifically the acido-basicity properties of the support and the final catalyst. Further, impregnations with molbydates or tungstates, especially the use of ammonium para-molybdate, can also be carried out. Optionally, such additional impregnations with metal salts can instead take place on the treated catalyst support particles, before or after calcination thereof.

The preshaped or preformed catalyst support particles may preferably have an average pore diameter between 8 and 50 nanometers, more preferably between 10 and 15 nanometers. The support pore volume may be between 0.1 and 1 ml/g catalyst support, preferably between 0.3 and 0.9 ml/g catalyst support. The pre-shaped support may be a particulate support, preferably with an average particle size of between 1 and 500 micrometers, preferably between 10 and 250 micrometers, still more particularly between 45 and 200 micrometers. The shaping of a preformed support with particle sizes between 1 and 500 micrometer can be done by means of spray-drying. After spray-drying this shaped support can be calcined.

The pre-shaped catalyst support may be selected from the group consisting of alumina in the form of one or more aluminium oxides, silica, titania, zirconia, magnesia, zinc oxide, activated carbon, molecular sieves, in particular zeolites, and mixtures or combinations thereof. Preferably the support is selected from the group consisting of alumina in the form of one or more aluminium oxides; titania, and silica. Typically, the support is alumina in the form of one or more aluminium oxides. The one or more aluminium oxides may be selected from the group including (preferably consisting of) gamma alumina, delta alumina, theta alumina and a mixture of two or more thereof. Preferably the group includes, or, preferably, consists of gamma alumina, delta alumina and a mixture of gamma alumina and delta alumina. The aluminium oxide catalyst support may be that obtainable under the trademark Puralox, preferably Puralox SCCa from SASOL Germany GmbH. Puralox SCCa (trademark) is a spray-dried aluminium oxide support consisting of a mixture of gamma and delta aluminium oxide or Al 4505 from BASF Germany GmbH. Al 4505 is obtainable as powders and shaped, for instance as Al4505 T1/8, as tablets.

The aluminium oxide is preferably a crystalline compound which can be described by the formula $Al_2O_3 \cdot xH_2O$ where $0<x<1$. The term aluminium oxide thus excludes $Al(OH)_3$, and $AlO(OH)$, but includes compounds such as gamma, delta and theta alumina.

Preferably, the catalyst support includes one or more modifying components. This is particularly the case where the support basis, that is the support excluding the modifying component, is soluble in a neutral and/or an acidic aqueous solution, or where the support basis is susceptible to hydrothermal attack as described below.

The modifying component may comprise a component that results in one or more of the following:
(i) decreases the dissolution of the catalyst support in an aqueous environment,
(ii) suppresses the susceptibility of the catalyst support to hydrothermal attack (especially during Fischer-Tropsch synthesis);
(iii) increases the pore volume of the catalyst support;
(iv) increases the strength and/or attrition and/or abrasion resistance of the catalyst support.

In a preferred embodiment of the invention, the modifying component decreases the dissolution of the catalyst support in an aqueous environment, i.e. increases the inertness of the catalyst support towards dissolution in an aqueous environment and/or suppresses the susceptibility of the catalyst support to hydrothermal attack, especially during Fischer-Tropsch synthesis. Such an aqueous environment may include an aqueous acid solution and/or an aqueous neutral solution, especially such an environment encountered during an aqueous phase impregnation catalyst preparation step. Hydrothermal attack can cause the sintering of the catalyst support (for example aluminium oxide), dissolution of Al ions or break up of the catalyst particles during hydrocarbon synthesis, especially Fischer-Tropsch synthesis, due to exposure to high temperature and water.

The modifying component is typically present in an amount that results in a level thereof in the catalyst support of at least 0.06 atoms per square nanometer.

The modifying component may be selected from the group consisting of Si, Zr, Co, Ti, Cu, Zn, Mn, Ba, Ni, Na, K, Ca, Sn, Cr, Fe, Li, Ti, Sr, Ga, Sb, V, Hf, Th, Ce, Ge, U, Nb, Ta, W, La and mixtures of thereof.

The modifying component may, more particularly, be selected from the group consisting of Si; Zr; Cu; Zn; Mn; Ba; La; Ti; W; Ni and mixtures thereof. Preferably the modifying component is selected from the group consisting of Si and Zr. In a preferred embodiment of the invention the modifying component is Si.

When the modifying component is Si, the silicon level in the resultant catalyst support is in an amount at least 0.06 Si atoms per square nanometer of the catalyst support, preferably at least 0.13 Si atoms pre square nanometer of the catalyst support, and more preferably at least 0.26 Si atoms per square nanometer of the catalyst support.

Preferably, the upper level is 2.8 Si atoms/nm$^2$ of the catalyst support.

The modified aluminium oxide catalyst support may be that obtainable under the trademark Siralox, obtainable from Sasol Germany GmbH, containing between 1.4 and 2.2 mass % Si.

In another embodiment of the invention, the catalyst support is in the form of one or more aluminium oxides or a silica modified aluminium oxide and is preferred over supports such as silica and titania, since it is believed that these supports provide a much more attrition resistant catalyst. The catalyst support in the form of one or more aluminium oxides or a silica modified aluminium oxide may also include La. It is believed that La improves attrition resistance.

In a further embodiment of the invention, the catalyst support is in the form of one or more aluminium oxides or a silica modified aluminium oxide may include titanium, preferably in an amount, expressed as elemental titanium, of at least 500 ppm by weight, preferably from about 1000 ppm to about 2000 ppm by weight. It is believed that the addition of the titanium to the catalyst support increases the activity of a catalyst formed, especially in the case of a cobalt FT catalyst, particularly when no noble metal promoters and preferably no Re or Ta promoters are present in the catalyst. Preferably, the titanium is included in the internal structure of the support and, preferably, no titanium is present as a deposit on the support.

It is believed that the presence of this titanium in the support also improves the attrition resistance of a catalyst which includes such a support.

In yet another embodiment of the invention, the catalyst support may be in the form of porous particles coated with carbon. In an alternative embodiment of the invention, the porous particles may, however, be free of such a carbon coating.

The catalyst support may be modified by introducing a modifying component precursor which includes a modifying component as described hereinabove onto and/or into a catalyst support material.

The removal of the carrier liquid from the slurry may include subjecting the slurry to drying and/or filtration. When drying is employed, drying by heat treatment, i.e. at elevated temperature, is preferred.

The chemisorption as hereinbefore described is thus effected by slurry phase mixing using a slurry made up of the pre-shaped support and the insoluble inorganic salt in the carrier liquid. Preferably, the slurry is aqueous. After chemisorption, the remaining carrier liquid may be removed by drying at above 25° C. at sub-atmospheric pressure and/or it may be removed by filtration.

When present, the drying during the impregnation, may be carried out under conditions at which the soluble (inorganic or organic) metal salt will not readily decompose. Preferably, the drying step is carried out at above 25° C. and preferably at sub-atmospheric pressure. Preferably, the slurry is dried at a temperature in the range of 40° C. to 120° C., typically about 100° C., with the final pressure typically being in the range 50 to 120 mbar, typically about 80 mbar.

During a potential repetition of the catalyst precursor chemisorption step as hereinbefore described, the calcined treated catalyst support may be subjected to slurry phase chemisorption, using a slurry made up of the calcined treated catalyst support and an insoluble inorganic metal salt (the metal of which is an active catalyst component as hereinbefore described) in a carrier liquid. Again, after chemisorption, the residual liquid may be removed by drying at above 25° C. at sub-atmospheric pressure or it may be removed by filtration.

Any subsequent impregnation may be carried out under conditions at which the soluble (inorganic or organic) metal salt will not readily decompose. Preferably, the drying step is carried out at above 25° C. and preferably at sub-atmospheric pressure.

The nitrogen content in the catalyst precursor may be less than 1 mass %, preferably less than 0.5 mass %.

Calcination, when carried out, is preferably carried out at a temperature above 25° C. causing the deposited and impregnated metal salts to decompose and/or to react with oxygen. Calcination is thus preferably carried out under oxidizing conditions. For example, cobalt nitrate may be converted into a compound selected from $CoO$, $CoO(OH)$, $Co_3O_4$, $Co_2O_3$ or a mixture of one or more thereof.

The calcination is typically effected in a fluidized bed, or in a rotary kiln. The at least partially dried impregnated treated catalyst support may be calcined in air. The temperature during calcination may then be between 100° C. to 600° C., preferably between 120° C. and 350° C., more preferably between 150° C. and 300° C., typically about 250° C., for obtaining cobalt oxide catalyst precursors. The temperature is normally increased from ambient temperature, typically 25° C., to 200-350° C. at a rate of between 0.1 and 10° C./min, preferably between 0.5 and 3° C./min. The GHSV during the calcination, especially of importance in fluidized beds and in the presence of nitrate impregnations will normally be in the range of 100 to 3000 h$^{-1}$, typically about 2000 h$^{-1}$. More particularly, the calcination conditions in the second preparation step may be selected such that, in the catalyst precursor, substantially all reducible metal is present in a calcined state. Apart from the methods mentioned above, calcination may be effected also, for example, in movable or fixed beds.

The calcination may be carried out by using a heating rate and a space velocity that comply with the following criteria:
(i) when the heating rate is ≤1° C./min, the space velocity is at least 0.76 m$_n^3$/(kg Co(NO$_3$)$_2$.6H$_2$O)/h; and (ii) when the heating rate is higher than 1° C./min, the space velocity satisfies the relation:

$$\log (\text{space velocity}) \geq \log 0.76 + \frac{\log 20 - \log 0.76}{2} \log (\text{heating rate})$$

According to a second aspect of the invention, there is provided a catalyst precursor, which is obtained or is obtainable by the process according to the first aspect of the invention, and comprises metal in an amount of between 5 and 90 mass %, based on the total precursor mass.

The precursor preferably comprises between 10 and 70 mass %, and more preferably between 10 and 50 mass % of metal. The catalyst precursor is essentially free of exchangeable ions.

The catalyst precursor may be a hydrocarbon synthesis catalyst precursor. Preferably, it may then be a Fischer-Tropsch synthesis catalyst precursor. More preferably, it may then be a slurry phase Fischer-Tropsch synthesis catalyst precursor. The metal of the soluble metal compound/salt may be cobalt. Preferably, the metal of the insoluble metal compound/salt is then also cobalt, which is thus the active component of the eventual catalyst. The catalyst precursor is then a cobalt-based Fischer-Tropsch synthesis catalyst precursor.

However, instead, the catalyst precursor may be a hydrogenation catalyst precursor suitable for the hydrogenation of organic compounds. More specifically, the catalyst precursor may then be an aromatic, nitro compound, nitrile, alkyne, alkene, diene or an aldehyde hydrogenation catalyst precursor, or a hydrodechlorination catalyst precursor. For example, the catalyst precursor can also be an alcohol or ammonia synthesis catalyst precursor.

When the hydrotreating catalyst precursor is cobalt-based, it can be formed in the same manner as the cobalt-based Fischer-Tropsch synthesis catalyst precursor hereinbefore described. Typically, the catalyst support will be impregnated with ammonium para molybdate, dried and optionally calcined and used as such in the invention. A similar preparation process can be applied to prepared NiMo catalysts. Cobalt and/or nickel in combination with molybdenum are particularly suitable for preparing a hydrotreating catalyst precursor in accordance with the present invention, especially these type of catalyst can be applied for HDM (hydro demetallization), HDS (hydro desulphurization), HDN (hydro-denitrogenation) or for pyrolysis gas hydrogenations.

According to a third aspect of the invention, there is provided a process for preparing a catalyst, which includes preparing a catalyst precursor using the process of the first aspect of the invention, and reducing the catalyst precursor so prepared, to obtain a catalyst.

When the catalyst precursor is a hydrogenation catalyst precursor as hereinbefore described, the catalyst will then naturally be a hydrogenation catalyst. The hydrogenation catalyst can then be used for hydrogenation of aromatic, nitro compound, nitrile, alkyne, alkene, diene or an aldehyde or hydrodechlorination or alcohol or ammonia synthesis or for HDM (hydro demetallization), HDS (hydro desulphurization), HDN (hydro-denitrogenation) or for pyrolysis gas hydrogenations.

More particularly, the hydrogenation catalyst can then be applied very suitably to the production of fine chemicals, wherein it is of importance that high selectivity is maintained. Examples of reactions that can be catalyzed by nickel-based catalysts prepared in accordance with the present invention are hydrogenation, hydro-dechlorination, and the like.

In hydro-dechlorination reactions, the hydrogenation catalyst of the invention makes it possible to control the amount of hydrogen and the hydrogen/HCl partial pressures in the system very carefully, thereby substantially improving the selectivity of the reaction.

When the catalyst precursor is a cobalt-based Fischer-Tropsch synthesis catalyst precursor as hereinbefore described, the catalyst will naturally be a Fischer-Tropsch synthesis catalyst.

Surprisingly it was found that when a cobalt-based Fischer-Tropsch synthesis catalyst precursor as set out above is converted to a Fischer-Tropsch synthesis catalyst by means of reduction, the catalyst has a high and stable Fischer-Tropsch activity. Even more surprisingly, it was found that by using the chemisorption-impregnation preparation process as hereinbefore defined, not only is a desired high cobalt loading obtained, but a high degree of cobalt (metal and/or oxide) dispersion is also obtained, resulting in a catalyst with improved Fischer-Tropsch synthesis activity.

The catalyst precursor may be reduced or activated by any known reduction type, preferably by contacting the catalyst precursor with pure hydrogen or with a gaseous mixture containing hydrogen. The gaseous mixture may consist of hydrogen and one or more inert gases which are inert in respect of the active catalyst. Preferably the concentration of hydrogen is in the range of 0.1 to 100% and the reduction is carried out at any temperature above 100° C.

When the catalyst is a Fischer-Tropsch catalyst, the gaseous mixture preferably contains at least 90 volume % hydrogen. The reduction may be carried out at a temperature ranging from 250° C. to 550° C., preferably from about 300° C. to about 425° C., for a period ranging from 0.5 h to about 24 h and at a pressure ranging from ambient to about 40 atmospheres. Suitable reduction conditions for preparing the catalyst of the present invention can be found in patents WO-A-03/035257, WO-A-2008/135939, WO-A-2008/135940 and WO-A-2008/135941.

According to a fourth aspect of the present invention, there is provided a hydrocarbon synthesis process which comprises preparing a catalyst using the process of the third aspect of the invention; and contacting hydrogen with carbon monoxide at a temperature above 100° C. and a pressure of at least 10 bar with the catalyst so prepared, to produce hydrocarbons and, optionally, oxygenates of hydrocarbons.

The temperature may be from 180° C. to 250° C., more preferably from 210° C. to 240° C. The pressure more preferably may be from 10 bar to 70 bar.

Preferably, the hydrocarbon synthesis process is a Fischer-Tropsch process, more preferably a three phase Fischer-Tropsch process, still more preferably a slurry bed Fischer-Tropsch process for producing a wax product.

The hydrocarbon synthesis process may also include a hydroprocessing step for converting the hydrocarbons and, optionally, oxygenates to liquid fuels and/or chemicals.

The present invention extends also to products produced by the hydrocarbon synthesis process of the fourth aspect of the invention.

According to a fifth aspect of the present invention, there is provided a hydrogenation process which comprises preparing a catalyst using the process of the third aspect of the invention; and contacting hydrogen and an organic compound with the catalyst so prepared, to hydrogenate the organic compound.

The present invention extends also to products produced by the hydrogenation process of the fifth aspect of the invention.

The invention will now be described in more detail, with reference to the following non-limiting examples and the accompanying drawings.

EXAMPLE 1

Preparation of Comparative Catalyst 1

A 30 g Co/0.075 g Pt/100 g (1.5 g Si/100 g Puralox SCCa, see also WO-A-99/42214, example 1) catalyst was prepared on a particulate modified 1.5 g Si/100 g Puralox SCCa pre-shaped support using aqueous slurry phase impregnation and drying, followed by direct fluidised bed calcination in air.

This preparation was carried out by means of two impregnation and calcination steps, both of which used a soluble inorganic cobalt compound.

In particular, the catalyst, which is suitable for use in a slurry phase Fischer Tropsch synthesis, was prepared as follows:

43.70 g $Co(NO_3)_2.6H_2O$ was dissolved in 40 ml distilled water, and 0.024 g of $Pt(NH_3)_4.(NO_3)_2$ (dissolved in 10 ml distilled water) was added to this solution, after which 50.0 g of the 1.5 g Si/100 g Puralox SCCa modified pre-shaped support was added to the solution. Aqueous slurry phase impregnation and vacuum drying were then effected by increasing the temperature from 60 to 95° C., while the vacuum was reduced from 170 to 75 mbar.

This vacuum dried intermediate was directly subjected to a fluidized bed calcination step using a continuous air flow of 1.7 $dm^3_n$/min, while increasing the temperature from 25° C. to 250° C. at 1° C./min and keeping it at 250° C. for 6 h.

50.0 g of this intermediate calcined material was subjected to the following $2^{nd}$ cobalt/platinum impregnation and calcination step: 23.51 g $Co(NO_3)_2.6H_2O$ was dissolved in 40 ml distilled water and 0.039 g of $Pt(NH_3)_4.(NO_3)_2$ (dissolved in 10 ml distilled water) was added to this solution, and 50.0 g of the ex $1^{st}$ cobalt/platinum impregnated and calcined intermediate was added. Aqueous slurry phase impregnation and vacuum drying were effected. This vacuum dried intermediate was directly subjected to a fluidized bed calcination step, according to the following procedure using a continuous air flow of 1.7 $dm^3_n$/min, while increasing the temperature from 25° C. to 250° C. at 1° C./min and keeping it at 250° C. for 6 h.

In preparation for laboratory scale slurry phase continuous stirred tank reactor ('CSTR') Fischer-Tropsch synthesis (FTS) runs, this calcined material was reduced and wax coated in accordance with the following procedure: 10 g of the catalyst was reduced at 1 bar in pure $H_2$ (space velocity=2000 $ml_n$ $H_2$/g catalyst/h) whilst the temperature was increased from 25° C. to 425° C. at a rate of 1° C./min where after the temperature was kept constant at this temperature of 425° C. for 16 h. The reduced catalyst was allowed to cool down to room temperature at which stage the hydrogen was replaced by argon, and the catalyst unloaded in molten Fischer-Tropsch wax under the protection of an argon blanket. This wax coated catalyst was then transferred to the slurry reactor.

EXAMPLE 2

$Co(OH)_2$ Only

Preparation of Inventive Catalyst Precursor 2

A 5.0 g Co/100 g support catalyst precursor was prepared on a particulate silica modified alumina support using chemisorption, followed by direct fluidised bed calcination in air.

In particular, the catalyst precursor was prepared as follows:

Chemisorption 40 g of silica modified alumina was added to a suspension of 3.2 g of particulate cobalt hydroxide in 90 ml of water. The resulting mixture, which was in the form of a slurry, had a pH of 7.5. Aqueous slurry phase chemisorption was effected for 18 h at 80° C. During this process the pH slowly decreased to 5. The water layer was decanted from the mixture, and after three washings with water, the light purple colored product was dried at 40 mbar and 80° C. This vacuum dried treated catalyst precursor or intermediate was subjected to fluidized bed calcination, according to the following procedure using a continuous air flow of 1.6 $dm^3_n$/min, while increasing the temperature from 25° C. to 250° C. at 1° C./min and keeping it at 250° C. for 6 h.

EXAMPLE 3

$Co(OH)_2$ and $Co(NO_3)_2$ in Succession

Preparation of Inventive Catalyst 3

A 20 g Co/0.070 g Pt/100 g support catalyst was prepared on a particulate silica modified alumina support using sequential chemisorption-impregnation aqueous slurry phase preparation and drying, followed by direct fluidised bed calcination in air.

This preparation was done by means of two preparation steps: The first preparation step included chemisorption using cobalt hydroxide, while the second preparation step included impregnation using cobalt nitrate.

In particular, the catalyst was prepared as follows:

Cobalt Nitrate Solution

A cobalt nitrate solution was prepared using $Co(NO_3)_2.6H_2O$ and $Pt(NH_3)_4.(NO_3)_2$ resulting in a solution containing 140.2 g/l Co and 0.5328 g/l Pt. The pH of the solution was adjusted to 2.7 using nitric acid.

Chemisorption/Impregnation 40 g of silica modified alumina was added to 3.2 g of particulate cobalt hydroxide in 90 ml of water. The resulting suspension had a pH of 7.5. Aqueous slurry phase chemisorption was effected for 18 h at 80° C. During this process the pH slowly decreased to 5. The water layer was decanted from the mixture, and after three washings with water, the purple colored product was dried at 40 mbar and 80° C.

The treated catalyst support or intermediate material from chemisorption was subjected to the following cobalt/platinum impregnation and calcination step:

30.0 g ex chemisorbed material and 47.7 ml of the cobalt nitrate solution were subjected to aqueous slurry phase impregnation and vacuum drying according to the details provided in the impregnation and vacuum drying protocol in Example 1. This vacuum dried intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 4

$Co(OH)_2$ and $Co(NO_3)_2$ Simultaneously

Preparation of Inventive Catalyst 4

A 19.2 g Co/0.070 g Pt/100 g support catalyst was prepared on a particulate silica modified alumina support using simultaneous chemisorption-impregnation aqueous slurry phase preparation and drying, followed by direct fluidised bed calcination in air.

This preparation was done by means of a single preparation or processing step: The step included chemisorption using cobalt hydroxide and impregnation using cobalt nitrate. Thus, chemisorption and impregnation takes place in the same process step and is referred to as simultaneous chemisorption and impregnation.

In particular, the catalyst was prepared as follows:
Cobalt Nitrate Solution

A cobalt nitrate solution was prepared using $Co(NO_3)_2 \cdot 6H_2O$ and $Pt(NH_3)_4 \cdot (NO_3)_2$ resulting in a solution containing 140.2 g/l Co and 0.5328 g/l Pt. The pH of the solution was adjusted to 2.7 using nitric acid.
Chemisorption/Impregnation 40 g of silica modified alumina was added to a suspension of 3.2 g of solid particulate cobalt hydroxide in 57 g of the cobalt nitrate solution and 50 g of water. Aqueous slurry phase chemisorption was effected for 1 h at 80° C. During this process the pH of the slurry changed from 6 to 3.5. The resulting slurry of purple solid material in dark red solution was subjected to impregnation and vacuum drying according to the details provided in the impregnation and vacuum drying protocol in Example 1. This vacuum dried treated catalyst precursor or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 5

$Co(OH)_2$ and $Co(NO_3)_2$

Preparation of Inventive Catalyst 5

A 20.9 g Co/0.0795 g Pt/100 g support catalyst was prepared on a particulate silica modified alumina support using simultaneous chemisorption-impregnation aqueous slurry phase preparation and drying, followed by direct fluidised bed calcination in air.

This preparation was done by means of a single preparation step: The step included chemisorption using cobalt hydroxide and impregnation using cobalt nitrate.

In particular, the catalyst was prepared as follows:
Cobalt Nitrate Solution

A cobalt nitrate solution was prepared using $Co(NO_3)_2 \cdot 6H_2O$ and $Pt(NH_3)_4 \cdot (NO_3)_2$ resulting in a solution containing 141.2 g/l Co and 0.5396 g/l Pt. The pH of the solution was adjusted to 2.6 using nitric acid.
Chemisorption/Impregnation 40 g of silica modified alumina was added to a suspension of 4 g of solid particulate cobalt hydroxide in 57 g of the cobalt nitrate solution and 50 g of water. Aqueous slurry phase chemisorption was effected for 30 min at 60° C. During this process the pH of the slurry changed from 6 to 3.5. The resulting slurry of purple solid material in dark red solution was subjected to impregnation and vacuum according to the details provided in the impregnation and vacuum drying protocol in Example 1. This vacuum dried treated catalyst support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 6

Higher Loading in $1^{st}$ Prep-Step

Preparation of Inventive Catalyst 6

A 29.7 g Co/0.041 g Pt/100 g support catalyst was prepared on a particulate silica modified alumina support using simultaneous chemisorption-impregnation aqueous slurry phase preparation and drying, followed by direct fluidised bed calcination in air.

This preparation was done by means of a single preparation step: The step included chemisorption using cobalt hydroxide and impregnation using cobalt nitrate.

In particular, the catalyst was prepared as follows:
Cobalt Nitrate Solution

A cobalt nitrate solution was prepared using $Co(NO_3)_2 \cdot 6H_2O$ and $Pt(NH_3)_4 \cdot (NO_3)_2$ resulting in a solution containing 154.4 g/l Co and 0.213 g/l Pt. The pH of the solution was adjusted to 3.2 using nitric acid.
Chemisorption/Impregnation 40 g of silica modified alumina was added to a suspension of 10 g of solid particulate cobalt hydroxide in 57 g of the cobalt nitrate solution and 50 g of water. Aqueous slurry phase chemisorption was effected for 48 h at 60° C. During this process the pH of the slurry changed from 6 to 3.5. The resulting slurry of purple solid material in dark red solution was subjected to impregnation and vacuum according to the details provided in the impregnation and vacuum drying protocol in Example 1. This vacuum dried treated chemical support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 7

On Puralox

Preparation of Inventive Catalyst 7

A 21.1 g Co/0.029 g Pt/100 g (Puralox SCCa) support catalyst was prepared on a particulate Puralox SCCa support using simultaneous chemisorption-impregnation aqueous slurry phase preparation and drying, followed by direct fluidised bed calcination in air.

This preparation was done by means of a single preparation step: The step included chemisorption using cobalt hydroxide and impregnation using cobalt nitrate.

In particular, the catalyst was prepared as follows:
Cobalt Nitrate Solution

A cobalt nitrate solution was prepared using $Co(NO_3)_2 \cdot 6H_2O$ and $Pt(NH_3)_4 \cdot (NO_3)_2$ resulting in a solution containing 154.4 g/l Co and 0.213 g/l Pt. The pH of the solution was adjusted to 3.2 using nitric acid.
Chemisorption/Impregnation 40 g of Puralox SCCa was added to a suspension of 4 g of solid particulate cobalt hydroxide in 57 g of the cobalt nitrate solution and 50 g of water. Aqueous slurry phase chemisorption was effected for 30 min at 60° C. During this process the pH of the slurry changed from 6 to 3.5. The resulting slurry of purple solid material in dark red solution was subjected to impregnation and vacuum drying according to the details provided in the impregnation and vacuum drying protocol in Example 1. This vacuum dried treated catalyst support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 8

Preparation of Inventive Catalyst 8

A 14.5 g Co/0.020 g Pt/100 g (modified Puralox SCCa) support catalyst was prepared on a particulate 1.5 g Si/100 g Puralox SCCa modified support using simultaneous chemisorption-impregnation aqueous slurry phase preparation and drying, followed by direct fluidised bed calcination in air.

This preparation was done by means of a single preparation step: The step included chemisorption using cobalt hydroxide and impregnation using cobalt nitrate.

In particular, the catalyst was prepared as follows:
Cobalt Nitrate Solution

A cobalt nitrate solution was prepared using $Co(NO_3)_2 \cdot 6H_2O$ and $Pt(NH_3)_4 \cdot (NO_3)_2$ resulting in a solution containing 154.4 g/l Co and 0.213 g/l Pt. The pH of the solution was adjusted to 3.2 using nitric acid.
Chemisorption/Impregnation 40 g of 1.5 g Si/100 g Puralox SCCa 2/150 modified pre-shaped support was added to a suspension of 4 g of solid particulate cobalt hydroxide in 57 g of the cobalt nitrate solution and 50 g of water. Aqueous slurry phase chemisorption was effected for 30 min at 60° C. During this process the pH of the slurry changed from 6 to 3.5. The resulting slurry of purple solid material in dark red solution was subjected to impregnation and vacuum drying according to the details provided in the impregnation and vacuum drying protocol in Example 1. This vacuum dried treated catalyst support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 9

$Co(OH)_2$ and $Co(NO_3)_2$ in Another Ratio

Preparation of Inventive Catalyst 9

A 21.2 g Co/0.029 g Pt/100 g support catalyst was prepared on a particulate silica modified alumina support using simultaneous chemisorption-impregnation aqueous slurry phase preparation and drying, followed by direct fluidised bed calcination in air.

This preparation was done by means of a single preparation step: The step included chemisorption using cobalt hydroxide and impregnation using cobalt nitrate.

In particular, the catalyst was prepared as follows:
Cobalt Nitrate Solution

A cobalt nitrate solution was prepared using $Co(NO_3)_2 \cdot 6H_2O$ and $Pt(NH_3)_4 \cdot (NO_3)_2$ resulting in a solution containing 141.2 g/l Co and 0.5366 g/l Pt. The pH of the solution was adjusted to 2.6 using nitric acid.
Chemisorption/Impregnation 40 g of silica modified alumina was added to a suspension of 10 g of solid particulate cobalt hydroxide in 26 g of the cobalt nitrate solution and 80 g of water. Aqueous slurry phase chemisorption was effected for 3.5 h at 60° C. During this process the pH of the slurry changed from 6 to 3.5. The resulting slurry of purple solid material in dark red solution was subjected to impregnation and vacuum drying according to the details provided in the impregnation and vacuum drying protocol in Example 1. This vacuum dried treated catalyst support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 10

Co(OH)₂ and Co(NO₃)₂ Two Consecutive Impregnations

Preparation of Inventive Catalyst 10

A 41.2 g Co/0.051 g Pt/100 g (silica modified alumina) support catalyst was prepared on a particulate silica modified alumina support using two subsequent steps each consisting of: simultaneous chemisorption-impregnation aqueous slurry phase preparation and drying, followed by direct fluidised bed calcination in air.

This preparation was done by means of two subsequent equal preparation steps: each step included chemisorption using cobalt hydroxide and impregnation using cobalt nitrate.

In particular, the catalyst was prepared as follows:
Cobalt Nitrate Solution 1

A cobalt nitrate solution was prepared using $Co(NO_3)_2 \cdot 6H_2O$ and $Pt(NH_3)_4 \cdot (NO_3)_2$ resulting in a solution containing 154.4 g/l Co and 0.213 g/l Pt. The pH of the solution was adjusted to 3.2 using nitric acid.
Cobalt Nitrate Solution 2

A cobalt nitrate solution was prepared using $Co(NO_3)_2 \cdot 6H_2O$ and $Pt(NH_3)_4 \cdot (NO_3)_2$ resulting in a solution containing 141.2 g/l Co and 0.537 g/l Pt. The pH of the solution was adjusted to 2.5 using nitric acid.
Chemisorption/Impregnation In step 1: 40 g of silica modified alumina was added to a suspension of 10 g of solid particulate cobalt hydroxide in 57 g of the cobalt nitrate solution 1 and 50 g of water. Aqueous slurry phase chemisorption was effected for 1 h at 80° C. During this process the pH of the slurry changed from 6 to 3.5. The resulting slurry of purple solid material in dark red solution was subjected to impregnation and vacuum drying according to the details provided in the impregnation and vacuum drying protocol in Example 1. This vacuum dried treated catalyst support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

In step 2: 20 g of the ex step 1 material was added to a suspension of 1.6 g of solid particulate cobalt hydroxide in 32 g of the cobalt nitrate solution 2 and 30 g of water. Aqueous slurry phase chemisorption was effected for 1 h at 80° C. During this process the pH of the slurry changed from 6 to 3.5. The resulting slurry of black solid material in clear dark red solution was subjected to impregnation and vacuum drying according to the details provided in the impregnation and vacuum drying protocol in Example 1. This vacuum dried treated material or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 11

Co(OH)₂ and Co(NO₃)₂

Preparation of Inventive Catalyst 11

A 26.7 g Co/0.070 g Pt/100 g support catalyst was prepared on a particulate silica modified alumina support using simultaneous chemisorption-impregnation aqueous slurry phase preparation and drying, followed by direct fluidised bed calcination in air.

This preparation was done by means of a single preparation step: The step included chemisorption using cobalt hydroxide and impregnation using cobalt nitrate.

In particular, the catalyst was prepared as follows:
Cobalt Nitrate Solution

A cobalt nitrate solution was prepared using $Co(NO_3)_2 \cdot 6H_2O$ and $Pt(NH_3)_4 \cdot (NO_3)_2$ resulting in a solution containing 140.2 g/l Co and 0.5328 g/l Pt. The pH of the solution was adjusted to 2.7 using nitric acid.
Chemisorption/Impregnation 40 g of silica modified alumina was added to a suspension of 4 g of solid particulate cobalt hydroxide in 57 g of the cobalt nitrate solution and 50 g of water. Aqueous slurry phase chemisorption was effected for 1 h at 80° C. During this process the pH of the slurry changed from 6 to 3.5. The resulting slurry of purple solid material in dark red solution was subjected to impregnation and vacuum drying according to the details provided in the impregnation and vacuum drying protocol in Example 1. This vacuum dried treated catalyst support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 12

Co(OH)₂ and Co(NO₃)₂ in Two Consecutive Impregnations

Preparation of Inventive Catalyst 12

A 57.7 g Co/0.06 g Pt/100 g (silica modified alumina) support catalyst was prepared on a particulate silica modified alumina support using two subsequent steps each consisting of simultaneous chemisorption-impregnation aqueous slurry preparation and drying, followed by direct fluidised bed calcination in air.

This preparation was done by means of two subsequent equal preparation steps: each step included chemisorption using cobalt hydroxide and impregnation using cobalt nitrate.

In particular, the catalyst was prepared as follows:
Cobalt Nitrate Solution 1

A cobalt nitrate solution was prepared using $Co(NO_3)_2 \cdot 6H_2O$ and $Pt(NH_3)_4 \cdot (NO_3)_2$ resulting in a solution containing 154.4 g/l Co and 0.213 g/l Pt. The pH of the solution was adjusted to 3.2 using nitric acid.
Cobalt Nitrate Solution 2

A cobalt nitrate solution was prepared using $Co(NO_3)_2 \cdot 6H_2O$ and $Pt(NH_3)_4 \cdot (NO_3)_2$ resulting in a solution containing 141.2 g/l Co and 0.537 g/l Pt. The pH of the solution was adjusted to 2.5 using nitric acid.
Chemisorption/Impregnation In step 1: 40 g of silica modified alumina was added to a suspension of 8 g of solid particulate cobalt hydroxide in 57 g of the cobalt nitrate solution 1 and 50 g of water. Aqueous slurry phase chemisorption was effected for 1 h at 80° C. During this process the pH of the slurry changed from 6 to 3.5. The resulting slurry of purple solid material in dark red solution was subjected to impregnation and vacuum drying according to the details provided in the impregnation and vacuum drying protocol in Example 1. This vacuum dried treated catalyst support intermediate was directly subjected to a fluidized bed calcination step, according to the following procedure using a continuous air flow of 1.6 dm$^3_n$/min, while increasing the temperature from 25° C. to 250° C. at 1° C./min and keeping it at 250° C. for 6 h.

In step 2: 20 g of the exit step 1 material was added to a suspension of 4 g of solid particulate cobalt hydroxide in 32 g of the cobalt nitrate solution 2 and 30 g of water. Aqueous slurry phase chemisorption was effected for 1 h at 80° C. During this process the pH of the slurry changes from 6 to 3.5. The resulting slurry of black solid material in clear dark red solution was subjected to impregnation and vacuum drying according to the details provided in the impregnation and vacuum drying protocol in Example 1. This vacuum dried treated material or intermediate was directly subjected to a fluidized bed calcination step, according to the following procedure using a continuous air flow of 1.6 dm$^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 13

$Ni(OH)_2$ en $Ni(NO_3)_2$ Simultaneously

Preparation of Inventive Catalyst Precursor 13

A 30.4 g Ni/100 g alumina support catalyst precursor was prepared on a particulate Puralox SCC a support using simultaneous chemisorption-impregnation aqueous slurry phase preparation and drying, followed by direct tubular flow reactor calcination in air.

This preparation was done by means of a single preparation step: The step included chemisorption using nickel hydroxide and impregnation using nickel nitrate.

In particular, the catalyst precursor was prepared as follows:

Nickel Nitrate Solution

A nickel nitrate solution was prepared using $Ni(NO_3)_2.6H_2O$ resulting in a solution containing 140 g/l Ni.

Chemisorption/Impregnation 40 g of Puralox SCC a-2/150 was added to a suspension of 8 g of solid particulate nickel hydroxide in 63 g of the nickel nitrate solution and 55 g of water. Aqueous slurry phase chemisorption was effected for 20 h at 80° C. The resulting slurry of blue-green solid material in green solution was subjected to impregnation and vacuum drying according to the details provided in the impregnation and vacuum drying protocol in Example 1. This vacuum dried treatment catalyst support or intermediate was directly subjected to a tubular flow reactor calcination, according to the following procedure using a continuous air flow of 69 dm$^3_n$/h, while increasing the temperature from 25° C. to 375° C. at 1° C./min and keeping it at 375° C. for 6 h.

EXAMPLE 14

$Co(OH)_2$ $Co(NO_3)_2$ and $Ni(NO_3)_2$ Simultaneously

Preparation of Inventive Catalyst 14

A 19.2 g Co/2.5 g Ni/0.070 g Pt/100 g support catalyst was prepared on a particulate silica modified alumina support using simultaneous chemisorption-impregnation aqueous slurry phase preparation and drying, followed by direct fluidised bed calcination in air.

This preparation was done by means of a single preparation step: The step included chemisorption using cobalt hydroxide and impregnation using cobalt nitrate and nickel nitrate.

In particular, the catalyst was prepared as follows:

Cobalt Nitrate Solution

A cobalt nitrate solution was prepared using $Co(NO_3)_2.6H_2O$ and $Pt(NH_3)_4.(NO_3)_2$ resulting in a solution containing 140.2 g/l Co and 0.5328 g/l Pt. The pH of the solution was adjusted to 2.7 using nitric acid.

Nickel Nitrate Solution

A nickel nitrate solution was prepared using $Ni(NO_3)_2.6H_2O$ resulting in a solution containing 140 g/l Ni Chemisorption/Impregnation 40 g of silica modified alumina was added to a suspension of 3.2 g of solid particulate cobalt hydroxide in 57 g of the cobalt nitrate solution and 7 g of the nickel nitrate solution and 50 g of water. Aqueous slurry phase chemisorption was effected for 18 h at 80° C. The resulting slurry of purple solid material in dark red solution was subjected to impregnation and vacuum drying according to the details provided in the impregnation and vacuum drying protocol in Example 1. This vacuum dried treated catalyst support or intermediate was directly subjected to a fluidized bed calcination step, according to the following procedure using a continuous air flow of 1.6 dm$^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 15

$Co(OH)_2$ and $Ni(OH)_2$ and $Co(NO_3)_2$ Simultaneously

Preparation of Inventive Catalyst 15

A 19.2 g Co/2.5 g Ni/0.070 g Pt/100 g support catalyst was prepared on a particulate silica modified alumina support using simultaneous chemisorption-impregnation aqueous slurry phase preparation and drying, followed by direct fluidised bed calcination in air.

This preparation was done by means of a single preparation step: The step included chemisorption using cobalt hydroxide and nickel hydroxide and impregnation using cobalt nitrate.

In particular, the catalyst was prepared as follows:
Cobalt Nitrate Solution

A cobalt nitrate solution was prepared using $Co(NO_3)_2.6H_2O$ and $Pt(NH_3)_4.(NO_3)_2$ resulting in a solution containing 140.2 g/l Co and 0.5328 g/l Pt. The pH of the solution was adjusted to 2.7 using nitric acid.
Chemisorption/Impregnation 40 g of silica modified alumina was added to a suspension of 3.2 g of solid particulate cobalt hydroxide and 1.6 g of solid particulate nickel hydroxide in 57 g of the cobalt nitrate solution and 50 g of water. Aqueous slurry phase chemisorption was effected for 18 h at 80° C. The resulting slurry of purple solid material in dark red solution was subjected to impregnation and vacuum drying according to the details provided in the impregnation and vacuum drying protocol in Example 1. This vacuum dried treated catalyst support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 16

$Co(OH)_2$ and $Mn(OH)_2$ and $Co(NO_3)_2$ Simultaneously

Preparation of Inventive Catalyst 16

A 19.2 g Co/4 g Mn/0.070 g Pt/100 g support catalyst was prepared on a particulate silica modified alumina support using simultaneous chemisorption-impregnation aqueous slurry phase preparation and drying, followed by direct fluidised bed calcination in air.

This preparation was done by means of a single preparation step: The step included chemisorption using cobalt hydroxide and nickel hydroxide and impregnation using cobalt nitrate.

In particular, the catalyst was prepared as follows:
Cobalt Nitrate Solution

A cobalt nitrate solution was prepared using $Co(NO_3)_2.6H_2O$ and $Pt(NH_3)_4.(NO_3)_2$ resulting in a solution containing 140.2 g/l Co and 0.5328 g/l Pt. The pH of the solution was adjusted to 2.7 using nitric acid.
Chemisorption/Impregnation 40 g of silica modified alumina was added to a suspension of 3.2 g of solid particulate cobalt hydroxide and 2.7 g of solid manganese hydroxide in 57 g of the cobalt nitrate solution and 50 g of water. Aqueous slurry phase chemisorption was effected for 18 h at 80° C. The resulting slurry of purple solid material in dark red solution was subjected to impregnation and vacuum drying according to the details provided in the impregnation and vacuum drying protocol in Example 1. This vacuum dried treated catalyst support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 17

$Co(OH)_2$ en $Co(NO_3)_2$ on $ZrO_2$

Preparation of Inventive Catalyst 17

A 26.6 g Co/0.070 Pt/100 g zirconium(IV) oxide support catalyst was prepared on a particulate $ZrO_2$ (from Acros Organics of p.a quality (98% $ZrO_2$)) support using simultaneous chemisorption-impregnation aqueous slurry phase preparation and drying, followed by direct fluidised bed calcination in air.

This preparation was done by means of a single preparation step: The step included chemisorption using cobalt hydroxide and impregnation using cobalt nitrate.

In particular, the catalyst was prepared as follows:
Cobalt Nitrate Solution

A cobalt nitrate solution was prepared using $Co(NO_3)_2.6H_2O$ and $Pt(NH_3)_4.(NO_3)_2$ resulting in a solution containing 140.2 g/l Co and 0.5328 g/l Pt. The pH of the solution was adjusted to 2.7 using nitric acid.
Chemisorption/Impregnation 40 g of $ZrO_2$ was added to a suspension of 8 g of solid particulate cobalt hydroxide in 57 g of the cobalt nitrate solution and 50 g of water. Aqueous slurry phase chemisorption was effected for 18 h at 80° C. The resulting slurry of light pink solid material in red solution was subjected to impregnation and vacuum drying according to the details provided in the impregnation and vacuum drying protocol in Example 1. This vacuum dried treated catalyst support or intermediate was directly subjected to a fluidized bed calcination step, according to the following procedure using a continuous air flow of 1.6 $dm^3_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 18

$Cu(OH)_2$ en $Cu(NO_3)_2$ on $ZrO_2$

Preparation of Inventive Catalyst Precursor 18

A 19 g Cu/100 g zirconium(IV) oxide support catalyst precursor was prepared on a particulate $ZrO_2$ (from Acros Organics of p.a quality (98% $ZrO_2$)) support using simultaneous chemisorption-impregnation aqueous slurry phase preparation and drying, followed by direct fluidised bed calcination in air.

This preparation was done by means of a single preparation step: The step included chemisorption using copper hydroxide and impregnation using copper nitrate.

In particular, the catalyst precursor was prepared as follows:
Copper Nitrate Solution A copper nitrate solution was prepared using $Cu(NO_3)_2.6H_2O$ resulting in a solution containing 140 g/l Cu.

Chemisorption/Impregnation 40 g of $ZrO_2$ was added to a suspension of 4 g of solid particulate copper hydroxide in 63 g of a the copper nitrate solution and 50 g of water. Aqueous slurry phase chemisorption was effected for 18 h at 80° C. The resulting slurry of light blue green solid material in blue solution was subjected to impregnation and vacuum drying.

EXAMPLE 19

$Co(OH)_2$ en $Co(NO_3)_2$—Eggshell Catalyst

Preparation of Inventive Catalyst Precursor 19

A 7 g Co/0.030 Pt/100 g support catalyst precursor was prepared on a Al 4505 T1/8 preshaped support using simultaneous chemisorption-impregnation aqueous slurry phase preparation and drying, followed by direct fluidised bed calcination in air.

This preparation was done by means of a single preparation step: The step included chemisorption using cobalt hydroxide and impregnation using cobalt nitrate.

In particular, the catalyst precursor was prepared as follows:

Cobalt Nitrate Solution

A cobalt nitrate solution was prepared using $Co(NO_3)_2.6H_2O$ and $Pt(NH_3)_4.(NO_3)_2$ resulting in a solution containing 140.2 g/l Co and 0.5328 g/l Pt. The pH of the solution was adjusted to 2.7 using nitric acid.

Chemisorption/Impregnation 40 g of Al 4505 T1/8 was added to a suspension of 0.5 g of solid particulate cobalt hydroxide in 25 g of the cobalt nitrate solution and 50 g water. Aqueous slurry phase chemisorption was effected for 18 h at 80° C. The resulting slurry of pink purple colored tablets in dark red clear solution was subjected to impregnation and vacuum drying according to the details provided in the impregnation and vacuum drying protocol in Example 1. This vacuum dried treated catalyst support or intermediate was directly subjected to a fixed bed calcination step, according to the following procedure using a continuous air flow of 1.6 $dm^3{}_n$/min, while increasing the temperature from 25° C. to 250° C. at 1° C./min and keeping it at 250° C. for 6 h.

EXAMPLE 20

$Co(OH)_2$ and $Co(NO_3)_2$ in Succession as for Example 3 but Using Less Platinum Preparation of Inventive Catalyst 20

A 20 g Co/0.035 g Pt/100 g support slurry phase catalyst was prepared on a particulate silica modified alumina support using sequential chemisorption-impregnation aqueous slurry phase preparation and drying, followed by direct fluidised bed calcination in air.

This preparation was done by means of two preparation steps: The first preparation step included chemisorption using cobalt hydroxide, while the second preparation step included impregnation using cobalt nitrate.

In particular, the catalyst was prepared as follows:

Cobalt Nitrate Solution

A cobalt nitrate solution was prepared using $Co(NO_3)_2.6H_2O$ and $Pt(NH_3)_4.(NO_3)_2$ resulting in a solution containing 140.2 g/l Co and 0.2664 g/l Pt. The pH of the solution was adjusted to 2.7 using nitric acid.

Chemisorption/Impregnation 40 g of silica modified alumina was added to a suspension of 3.2 g of particulate cobalt hydroxide in 90 ml of water. The resulting slurry had a pH of 7.5. Aqueous slurry phase chemisorption was effected for 18 h at 80° C. During this process the pH slowly decreased to 5. The water layer was decanted from the mixture, and after three washings with water, the purple colored product was dried at 40 mbar and 80° C.

The resultant treated catalyst support or intermediate material from chemisorption was subjected to the following cobalt/platinum impregnation and calcination step:

30.0 g ex chemisorbed material and 47.7 ml of the cobalt nitrate solution were subjected to aqueous slurry phase impregnation and vacuum drying according to the details provided in the impregnation and vacuum drying protocol in Example 1. This vacuum dried intermediate was directly subjected to a fluidized bed calcination step, according to the following procedure using a continuous air flow of 1.6 $dm^3{}_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 21

$Co(OH)_2$ and $Co(NO_3)_2$ in Succession, No Platinum

Preparation of Inventive Catalyst 21

A 20 g Co/100 g support catalyst was prepared on a particulate silica modified alumina support using sequential chemisorption-impregnation aqueous slurry phase preparation and drying, followed by direct fluidised bed calcination in air.

This preparation was done by means of two preparation steps: The first preparation step included chemisorption using cobalt hydroxide, while the second preparation step included impregnation using cobalt nitrate.

In particular, the catalyst was prepared as follows:

Cobalt Nitrate Solution

A cobalt nitrate solution was prepared using $Co(NO_3)_2.6H_2O$ resulting in a solution containing 140.2 g/l Co. The pH of the solution was adjusted to 2.7 using nitric acid.

Chemisorption/Impregnation 40 g of silica modified alumina was added to a suspension of 3.2 g of particulate cobalt hydroxide in 90 ml of water. The resulting slurry had a pH of 7.5. Aqueous slurry phase chemisorption was effected for 18 h at 80° C. During this process the pH slowly decreased to 5. The water layer was decanted from the mixture, and after three washings with water, the purple colored product was dried at 40 mbar and 80° C.

The treated catalyst support or intermediate material from chemisorption was subjected to the following cobalt/platinum impregnation and calcination step:

30.0 g ex chemisorbed material and 47.7 ml of the cobalt nitrate solution were subjected to aqueous slurry phase impregnation and vacuum drying according to the details provided in the impregnation and vacuum drying protocol in Example 1. This vacuum dried intermediate was directly subjected to a fluidized bed calcination step, according to the following procedure using a continuous air flow of 1.6 $dm^3{}_n$/min, while increasing the temperature from 25° C. to 250° C. at 1° C./min and keeping it at 250° C. for 6 h.

The catalyst precursor (i.e. after the chemisorption, impregnation and calcination) was activated/reduced to obtain the catalyst by using the procedure described in Example 1, except that the end reduction temperature was 375° C.

EXAMPLE 22

Characterisation of Catalyst Precursors Versus Comparative Catalyst 1

Catalysts 1, 4, 5, 10, 12, 14 and 15 were tested for Fischer-Tropsch synthesis performance using a slurry phase CSTR. The following Fischer-Tropsch synthesis reaction conditions were maintained:
Reactor temperature: 230° C.
Reactor pressure: 17 bar
Catalyst inventory: ca. 10 g
($H_2$+CO) conversion: 50-65%
$H_2$:CO inlet ratio: 1.6:1
Argon internal standard: 15 vol. %

As all FT conditions were the same, the relative FT activity was determined by calculating the FT activity of each catalyst as mole CO converted/g catalysts and made relative to comparative catalyst 1 (see Table 1).

Catalyst 4, as prepared in accordance with the invention using cobalt hydroxide for the chemisorption and cobalt nitrate for the impregnation, had a relatively 19% lower cobalt loading and showed an activity comparable to catalyst 1, which was prepared by using cobalt nitrate in two successive impregnation steps, under the reaction conditions as described above.

Catalyst 5, as prepared in accordance with the invention using cobalt hydroxide for the chemisorption and cobalt nitrate for the impregnation, had a relatively 15% higher cobalt loading and showed an activity of 34% higher than catalyst 1, which was prepared by using cobalt nitrate in two successive impregnation steps, under the reaction conditions as described above.

Catalyst 10, as prepared in accordance with the invention using cobalt hydroxide for the chemisorption and cobalt nitrate for the impregnation but in a different ratio compared to the previous examples comprising a higher Co(OH)$_2$ loading. At an overall cobalt content of 29.2% (m/m) (i.e. a 46% higher cobalt loading), this catalyst showed an activity of 52% higher than comparative catalyst 1, under the reaction conditions as described above.

Catalyst 12, as prepared in accordance with the invention using a sequence of two repetitive preparation steps using cobalt hydroxide for the chemisorption and cobalt nitrate for the impregnation resulting in a high cobalt loading (36.6% (m/m); i.e. a 83% higher cobalt loading) and showed an activity of 17% higher than catalyst 1, which was prepared by using cobalt nitrate in two successive impregnation steps, under the reaction conditions as described above.

Catalysts 2 to 11 and 13 to 16, as prepared according to the invention showed a higher dispersion of smaller cobalt crystallites compared to the conventionally prepared cobalt nitrate-only impregnated catalyst 1. This improved dispersion is demonstrated by the XRD crystallite size, as shown in Table 1. In addition, these catalysts had improved cobalt surface areas as demonstrated by comparing the Hydrogen Adsorption Capacity (HAC) data (see also Table 1). The HAC values are derived from the quantity of hydrogen (in ml/g of supported catalyst) to be adsorbed after reduction of the cobalt. The experiment is performed in three stages: 1) reduction of the cobalt, 2) saturation of the reduced catalyst with hydrogen and 3) desorption of the hydrogen under an inert atmosphere from −75° C. to 350° C.

TABLE 1

Cobalt/metal content. cobalt/metal oxide crystallite size. and relative Fischer-Tropsch (FT) activity for catalysts 1 to 21

| Catalyst | Metal content prior to reduction [m %] | XRD crystallite size of oxide precursor prior to reduction [nm] | Hydrogen adsorption capacity [ml/g] | Relative FT activity |
|---|---|---|---|---|
| 1 (comp) | 20 | 15 | 3.6 | 100 |
| 2 | 5 | 14.2 | | |
| 3 | 16.7 | 13.5 | 4.2 | |
| 4 | 16.2 | 10.6 | 4.1 | 100 |
| 5 | 22.9 | 10.9 | 4.8 | 134 |
| 6 | 17.4 | 10.6 | 4 | |
| 7 | 17.7 | 10.9 | 4.3 | |
| 8 | 17.5 | 9.0 | 3.7 | |
| 9 | 17.3 | 10.8 | 4.3 | |
| 10 | 29.2 | 14.9 | 6.5 | 152 |
| 11 | 21.1 | 11.6 | 5.1 | |
| 12 | 36.6 | 17.6 | 6.6 | 117 |
| 13 | 23.3 (Ni) | 10-12 | 7.8 | |
| 14 | 16.7(+2.4 Ni) | 10.7 | 4.5 | 75 |
| 15 | 16.7(+1.9 Ni) | 10.6 | 4.8 | 61 |
| 16 | 16.7(+1.5Mn) | 10.2 | 4 | |
| 17 | 26.6 | | 3.3 | |
| 18 | 16.7 (Cu) | | | |
| 19 | 7 | | 1.9 | |
| 20 | 16.5 | | | |
| 21 | 16.5 | | | |

The average cobalt oxide crystallite size determined by means of XRD, for comparative catalyst 1, was 15 nm, while the average cobalt oxide crystallite size determined for catalysts 4 to 9 (i.e. according to the invention) were significantly smaller, around 10-11 nm.

EXAMPLE 23

Evidence of Reaction Between Co(OH)$_2$ Slurry and Support

Figure 1:
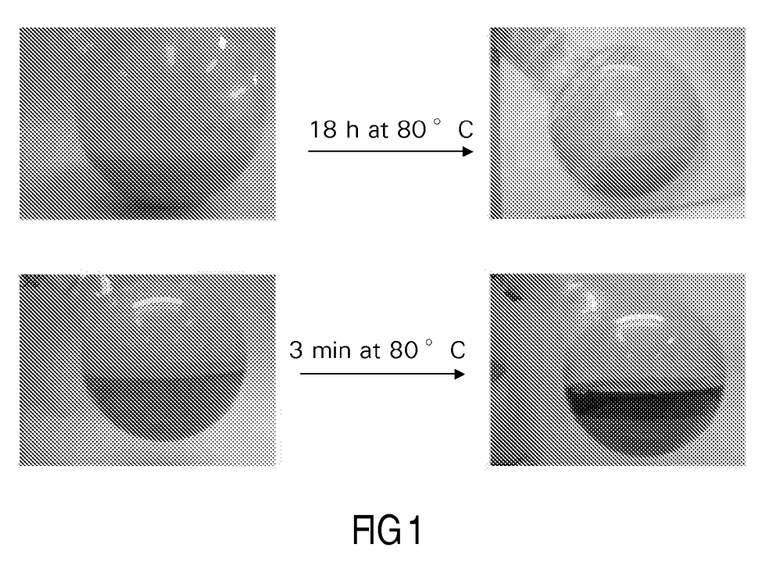
FIG. 1 shows, for Example 23, images of a $Co(OH)_2$ slurry in water containing silica modified alumina support prior to and after mixing at 80° C.

The reaction of a metal hydroxide slurry with a support is a surprising feature. For that reason the invention is supported with the images and data gathered in this example. In FIG. 1, it can be seen the images of a Co(OH)$_2$ slurry in water containing silica modified alumina support prior (left) and after mixing at 80° C.

The images at the top represent a mixture without Co(NO$_3$)$_2$. It was observed that the reaction between the Co(OH)$_2$ and the silica modified alumina was completed in 18 h at this temperature, resulting in a light purple solid with a clear water layer on top.

The images at the bottom represent a mixture of Co(OH)$_2$, the silica modified alumina and soluble Co(NO$_3$)$_2$. In that case the reaction between Co(OH)$_2$ and the support is completed within 4 min, resulting in a purple solid having a clear, dark red liquid layer (due to the presence of cobalt nitrate) on top.

Figure 2:
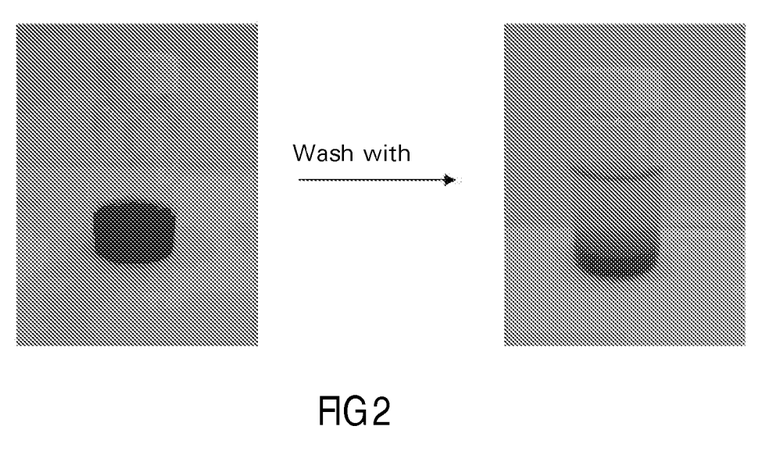
FIG. 2 shows, for Example 23, images of a sample of a mixture containing $Co(NO_3)_2$ on top of the dark purple solid ex-cobalt hydroxide on the support.

A sample of the mixture containing the Co(NO$_3$)$_2$ on top of the dark purple solid, ex-cobalt hydroxide on the support, is again depicted in FIG. 2 (picture on the left). When this is washed with three portions of water, the dark purple material, ex-cobalt hydroxide, remains attached to the support and the washings are clear and colorless (picture to the right).

Figure 3:
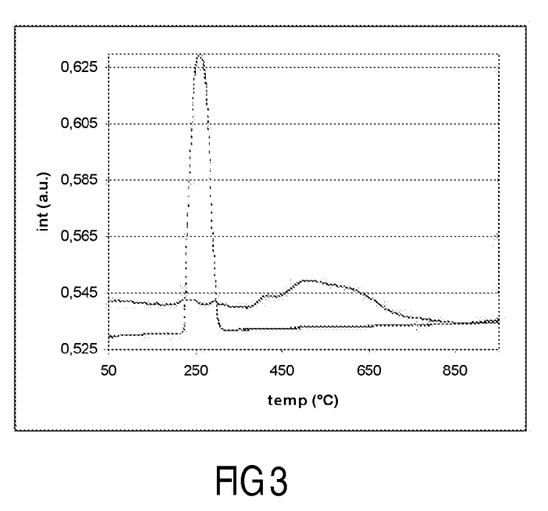
FIG. 3 shows, for Example 23, TPR data of a physical mixture of $Co(OH)_2$ and silica modified alumina vs chemisorbed $Co(OH)_2$ on silica modified alumina.

Further proof is given on the basis of reduction profiles recorded using the Temperature Programmed Reduction technique. FIG. 3 shows the TPR data of a physical mixture of $Co(OH)_2$ and silica modified alumina (dashed line) vs chemisorbed $Co(OH)_2$ on silica modified alumina (solid line). In a physical mixture of 10% $Co(OH)_2$ and 90% alumina support, the cobalt is typically reduced to Co(0) at 260° C. (FIG. 3, dashed line). The product of the reaction of $Co(OH)_2$ from a slurry with alumina is clearly showing a different reduction profile (solid line). A broad hump ranging from 400 to 750° C. (solid line) is an indication that this reduction to Co(0) originates from cobalt species having a strong interaction with the alumina support.

Figure 4:
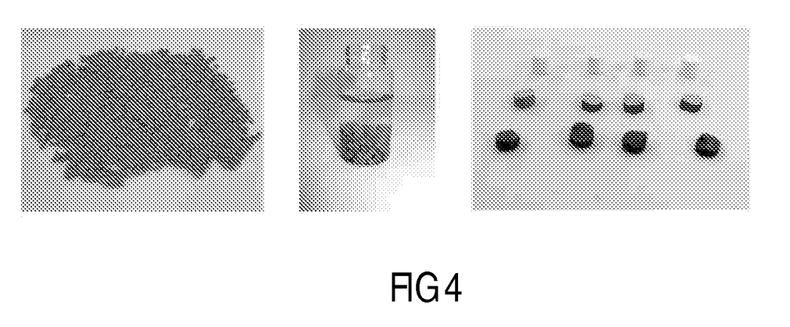
FIG. 4 shows, for Example 23, images of a mixture of $Co(OH)_2$ and alumina tablets in water.

Additionally, $Co(OH)_2$ was chemisorbed onto alumina tablets according the same technique. A mixture of $Co(OH)_2$ and alumina tablets in water resulted in an egg shell distribution of the cobalt precursor on the tablets. In FIG. 4, the left image shows the resulting coated tablets. The middle image in FIG. 4 shows the resulting product in water and that the cobalt remains completely on the tablets. The image to the right in FIG. 4 shows the separate stages of cobalt loading of tablets that have been cut in parts; the bottom row shows tablets after both chemisorption and impregnation (distribution throughout whole tablet), the middle row shows the tablets after chemisorption only (egg shell distribution) and the top row shows unloaded tablets as a reference.

It will be appreciated by those skilled in the art that the invention discloses a commercially viable method enabling a straightforward and cheap preparation sequence of metal deposition to a support that allows for a good dispersion at high loading on a mechanical robust support. Compared to the state of art, disadvantages can be avoided such as excessive washing procedures (no salts need to be removed).

The invention claimed is:

1. A process for preparing a catalyst precursor, which process includes
    forming a slurry of particles of an insoluble inorganic metal salt, particles and/or one or more bodies of a pre-shaped catalyst support in a carrier liquid, and a soluble metal salt dissolved in the carrier liquid, wherein the metals of the insoluble inorganic metal salt and the soluble metal salt are the same, and where the said metal is an active catalyst component, with the particles of the insoluble inorganic metal salt thus being contacted with the particles and/or the one or more bodies of the pre-shaped catalyst support and with the pre-shaped catalyst support thus being contacted at least once with the soluble metal salt, thereby to produce a treated catalyst support; and
    removing carrier liquid from the slurry to obtain a dried treated catalyst support, which either directly constitutes the catalyst precursor, or is optionally calcined to obtain the catalyst precursor.

2. A process according to claim 1, wherein the contacting of the particles of the insoluble inorganic metal salt with the particles and/or the one or more bodies of the pre-shaped catalyst support is carried out for at least one minute.

3. A process according to claim 1, wherein the pre-shaped catalyst support is porous, and is selected from the group consisting in a monolith, tablets, shaped artefacts, extrudates, spheres, and combinations of two or more of these.

4. A process according to claim 1, wherein the pre-shaped catalyst support is selected from the group consisting of aluminium oxide, silica, titania, zirconia, magnesia, zinc oxide, activated carbon, molecular sieves, zeolites, and combinations of two or more of these.

5. A process according to claim 1, wherein the metal of the insoluble inorganic metal salt and the soluble metal salt is selected from the group consisting of cobalt, nickel, manganese, iron, copper, ruthenium, molybdenum, zinc, and combinations of two or more of these.

6. A process according to claim 5, wherein the insoluble inorganic metal salt is $Co(OH)_2$, and/or wherein the soluble metal salt is $Co(NO_3)_2.6H_2O$.

7. A process according to claim 1, wherein particles of the pre-shaped catalyst support are used, and wherein the formation of the slurry comprises forming a solution of the soluble metal salt in the carrier liquid, suspending the insoluble inorganic metal salt particles in the carrier liquid to form a suspension, and adding the particles of the pre-shaped catalyst support to the carrier liquid prior to and/or during and/or subsequent to the formation of the suspension, to form the slurry, with the metal of the insoluble inorganic metal salt being deposited on the support particles and the metal of the soluble metal salt being deposited in and/or on the support particles.

8. A process according to claim 1, wherein the catalyst precursor comprises metal in an amount of between 5 mass % and 90 mass %, based on the total precursor mass.

9. A process according to claim 1, wherein the catalyst precursor is essentially free of exchangeable ions.

10. A process according to claim 1, wherein the catalyst precursor is a Fischer-Tropsch synthesis catalyst precursor.

11. A process according to claim 1, wherein the catalyst precursor is a hydrogenation catalyst precursor.

12. A process for preparing a catalyst, which includes preparing a catalyst precursor using the process of claim 1, and reducing the catalyst precursor so prepared, to obtain a catalyst.

13. A hydrocarbon synthesis process which comprises preparing a catalyst using the process of claim 12, and contacting hydrogen with carbon monoxide at a temperature above 100° C. and a pressure of at least 10 bar with the catalyst so prepared, to produce hydrocarbons and, optionally, oxygenates of hydrocarbons.

14. A process according to claim 13, which is a slurry bed Fischer-Tropsch process for producing a wax product.

15. A process according to claim 13, which includes a hydroprocessing step for converting the hydrocarbons and, optionally, oxygenates to liquid fuels and/or chemicals.

16. A hydrogenation process which comprises preparing a catalyst using the process of claim 12, and contacting hydrogen and an organic compound with the catalyst so prepared, to hydrogenate the organic compound.

* * * * *